(12) United States Patent
Schmidt et al.

(10) Patent No.: US 8,715,616 B2
(45) Date of Patent: May 6, 2014

(54) SOAK AND COKE

(75) Inventors: Roland Schmidt, Riyadh (SA);
Christopher J. LaFrancois,
Bartlesville, OK (US)

(73) Assignee: Phillips 66 Company, Houston, TX (US)

(*) Notice: Subject to any disclaimer, the term of this patent is extended or adjusted under 35 U.S.C. 154(b) by 0 days.

(21) Appl. No.: 13/357,989

(22) Filed: Jan. 25, 2012

(65) Prior Publication Data
US 2012/0207668 A1    Aug. 16, 2012

Related U.S. Application Data

(60) Provisional application No. 61/441,926, filed on Feb. 11, 2011.

(51) Int. Cl.
*C01B 3/38*    (2006.01)

(52) U.S. Cl.
USPC ........................................ 423/650

(58) Field of Classification Search
USPC .................................. 423/650–654
See application file for complete search history.

(56) References Cited

U.S. PATENT DOCUMENTS

| | | | | | |
|---|---|---|---|---|---|
| 3,915,844 | A | * | 10/1975 | Ueda et al. | 208/127 |
| 4,740,290 | A | * | 4/1988 | Tomita et al. | 208/67 |
| 5,788,724 | A | * | 8/1998 | Carugati et al. | 48/197 R |
| 2007/0100003 | A1 | | 5/2007 | Holley et al. | |
| 2008/0244976 | A1 | | 10/2008 | Paisley | |
| 2009/0165380 | A1 | * | 7/2009 | Lau et al. | 48/127.7 |
| 2009/0217585 | A1 | * | 9/2009 | Raman et al. | 48/127.7 |
| 2009/0218062 | A1 | * | 9/2009 | Schinski et al. | 162/189 |
| 2010/0083575 | A1 | * | 4/2010 | Varadaraj et al. | 48/209 |

FOREIGN PATENT DOCUMENTS

| | | |
|---|---|---|
| CN | 1214972 | 4/1999 |
| CN | 1435369 | 8/2003 |
| WO | 2009007061 | 1/2009 |

* cited by examiner

*Primary Examiner* — Melvin C Mayes
*Assistant Examiner* — Kenneth Vaden
(74) *Attorney, Agent, or Firm* — Phillips 66 Company

(57) ABSTRACT

There is provided herein a method for producing hydrogen gas, comprising: sorbing a liquid hydrocarbon fuel to a gasification catalyst to form a sorbed hydrocarbon fuel; heating said sorbed hydrocarbon fuel to a first temperature for a first period of time sufficient to form coke; and gasifying said coke at a second temperature at a pressure for a second period of time in the presence of water and/or oxygen, so as to produce hydrogen gas and carbon monoxide and to regenerate said catalyst. In particular, the hydrocarbon fuel can be a liquid biomass, such pyrolysis oil, and the method can be $CO_2$ neutral.

16 Claims, No Drawings

SOAK AND COKE

CROSS-REFERENCE TO RELATED APPLICATIONS

This application is a non-provisional application which claims the benefit of and priority to U.S. Provisional Application Ser. No. 61/441,926 filed Feb. 11, 2011, entitled "Soak and Coke," which is hereby incorporated by reference in its entirety.

FEDERALLY SPONSORED RESEARCH STATEMENT

Not applicable.

FIELD OF THE INVENTION

The invention relates to hydrogen production, particularly from a hydrocarbon fuel using a catalyst.

BACKGROUND OF THE INVENTION

Hydrogen generation and availability are perennial issues for oil refiners. Steam methane reforming (SMR) is the option of choice for many, but only at the expense of significant $CO_2$ emissions, which may be limited by future regulations and carbon taxes. Biomass-derived hydrogen can help alleviate and/or compliment the hydrogen supply of refinery operation, while simultaneously reducing the carbon footprint and, thus, lowering cost associated with pollution and greenhouse gas emission.

CN1435369 describes a method for preparing hydrogen gas by catalytic cracking of a biomass, comprising introducing heated air to fluidized-bed reactor, burning biomass in the presence of steam, fluidizing the biomass, gasifying, and cracking to generate a hydrogen-enriched gas.

CN1214972 describes gasification of a solid biomass in a down draft gasification reactor. The resulting gas undergoes a steam methane reforming and a tar fission reaction, producing a hydrogen-rich gas.

US2008244976 describes a method and system for gasifying biomass in an indirectly heated gasifier, and provides a method to eliminate condensable organic material from the resulting product gas. The method comprises a tar removal step that uses a circulating catalyst to crack organics and produce additional gas. The catalyst is heated in the gasification reactor and transferred to a conditioning chamber, where it catalyzes the cracking step.

US2007100003 describes a hybrid system for biomass gasification, wherein the biomass is pyrolyzed and the resulting solids and vapors are processed through supercritical steam gasification. Product gases are purified in an amine wash scrubber, an adiabatic pre-reformer breaks down remaining aromatic compounds, and are steam-reformed.

What is lacking is a simple and more efficient method to produce hydrogen without significant increase in $CO_2$ levels. We describe a method to adsorb biomass onto a catalyst, followed by gasification to produce $H_2$ and regenerate the catalyst.

SUMMARY OF THE INVENTION

We describe herein a method to adsorb biomass onto a catalyst, followed by gasification to produce $H_2$ and regenerate the catalyst. In preferred embodiments, the method is carbon neutral.

A biomass starting material, for example a pyrolysis oil, can be introduced and adsorbed onto a gasification catalyst, for example nickel, supported nickel, or other metal. Adsorption occurs under ambient conditions without additional heating, thus saving operating cost in energy savings and consequently also reducing $CO_2$ emissions. The "soaked" catalyst is then introduced to a reactor hot zone where coking occurs. Gasification, for example steam gasification, both regenerates the catalyst and produces bio-syngas, a combination of hydrogen and carbon monoxide. The bio-syngas can further undergo a water gas shift (WGS) reaction, yielding hydrogen and so-called "bio-$CO_2$", which is regarded as carbon neutral. Because of the catalyst, lower temperature can be used for the reaction, improving the economy of the process.

Soaking provides the biomass time to adsorb to the catalyst instead of elsewhere in a reactor, where it would cause fouling. Soaking also reduces or prevents equipment downtime and ensures that potential catalyst poisons contained in the biomass starting material are retained in the first part of the process and do not elaborate downstream. Thus, soaking produces gases that require less purification and clean-up than previous methods. When a supported catalyst is used, the catalyst, once fluidized, can act as an abrasive to keep the reactor from fouling.

Specifically, this application provides a method for producing hydrogen gas, comprising: sorbing a liquid hydrocarbon fuel to a gasification catalyst to form a sorbed hydrocarbon fuel; heating said sorbed hydrocarbon fuel to a first temperature for a first period of time sufficient to form coke; and gasifying said coke at a second temperature for a second period of time in the presence of water and/or oxygen, so as to produce a gaseous mixture comprising hydrogen gas and carbon monoxide, and to regenerate said catalyst.

The catalyst can be any catalyst that is known to decompose/crack organic molecules. Preferably, the catalyst is provided on a solid support, such as dolomite, silicas, aluminas, clays, etc., and mixtures thereof.

The water can be introduced into the reaction in the form of steam. The method can further comprise separating said hydrogen gas from said carbon monoxide. The method can further comprise subjecting said gaseous mixture to a water-gas shift, as to produce additional hydrogen gas and carbon dioxide; and separating said hydrogen gas and said additional hydrogen gas from said carbon dioxide and gaseous mixture.

The first period of time can depend on the temperature used: the lower the temperature, the longer the time required. For example, lower temperatures require between 10 minutes to more than 2 hours while higher temperatures require contact times of less than 10 minutes to form coke on said catalyst. It is particularly advantageous when the method uses a liquid biomass, such as a pyrolysis oil.

In a particular embodiment, there is provided a method for producing hydrogen gas, comprising: sorbing a liquid or liquefied biomass to a gasification catalyst to form a sorbed biomass, wherein said gasification catalyst comprises one or more selected from the group consisting of nickel, palladium, platinum, iron, cobalt, manganese, tungsten, molybdenum, tantalum, alkali earth metals, alkali earth metal oxides, dolomite, sand, and mixtures thereof amd heating said liquid biomass to 50° C.-650° C. for a first period of time sufficient to form coke; and gasifying said coke at 400° C.-1000° C. in the presence of steam and/or oxygen and said catalyst, so as to produce a gaseous mixture comprising hydrogen gas and carbon monoxide, and to regenerate said catalyst.

DESCRIPTION OF EMBODIMENTS OF THE INVENTION

The following abbreviations are used herein:

| | |
|---|---|
| MS | Mass spectrometry |
| SMR | Steam methane reforming |
| TGA | Thermogravimetric analysis |
| WGS | Water gas shift |

"Hydrocarbon fuel" refers to any fuel, including fossil fuels, biomass fuels, and the like. "Fossil fuel" refers to fuel formed from natural resources, such as anaerobic decomposition of organisms, for example phytoplankton, zooplankton, and plant matter. Fossil fuels can include coal, crude oil, and natural gas.

"Biomass" refers to any biological material from living, or recently living organisms, such as wood, paper, agricultural waste, consumer waste, wood and paper waste, cereal and grass crops, vegetable and tree oils, algae, and the like. "Biomass fuel" or "biofuel" refers to a fuel derived from biological material of living or recently living organisms. Examples of biomass fuel include wood, charcoal, hydrogen gas, alcohol (e.g., ethanol), organic oils (e.g., palm oil, rapseed, jathorpa), manure, grass cuttings, and biodiesel. Sources of biological materials used in biomass fuel include, but are not limited to trees (e.g., poplar, pine, willow, oak, maple, eucalyptus, oil palm), miscanthus, switchgrass, hemp, corn, cassava, sorghum, sugarcane, sugar beet, soybean, sunflower, wheat, rapeseed, jathorpa, salicornia, mahua, mustard, flax, field pennycress, *pongamia pinnata*, and algae.

The liquid hydrocarbon fuel can be a liquid biomass, for example pyrolysis oil. "Pyrolysis oil" or "bio-oil" refers to a synthetic fuel designed to substitute petroleum. It is typically extracted by a biomass-to-liquid technology, using destructive distillation from dried biomass in a reactor at about 500° C. followed by cooling. Although exact composition of a pyrolysis oil depends on the biomass sources and processing conditions, a typical composition is shown in Table 1. The oil is acidic, has a density of about 1.2-1.3 kg/L, and an oxygen content to 40-50%, mostly from water. The heating value is about 16-21 MJ/kg, with a flash point of 40-100° C. Pyrolysis oil is denser than diesel, typically cannot be blended with diesel, and is not auto-igniting in a diesel engine.

TABLE 1

Typical pyrolysis oil content

| Component | Percent weight of composition |
|---|---|
| Water | 20-28% |
| Suspended solids and pyrolytic lignin | 22-36% |
| Hydroxyacetaldehyde | 8-12% |
| Levoglucosan | 3-8% |
| Acetic acid | 4-8% |
| Acetol | 3-6% |
| Cellubiosan | 1-2% |
| Glyoxal | 1-2% |
| Formaldehyde | 3-4% |
| Formic acid | 3-6% |

"Sorption" refers to any action of absorption into or adsorption onto a solid material through chemical (chemisorption) and/or physical (physiorption) interactions.

"Coke" refers to solid carbonaceous material derived from carbon-containing fuel, such as a hydrocarbon fuel. Coal, for example, produces coke from destructive distillation of low-ash, low-sulfur bituminous coal. Coke derived from petroleum is referred to as "petroleum coke" or "pet coke" or "petcoke", for example carbonaceous solid derived from oil refinery coker units or other cracking processes, or hard carbon and other crude oil impurities formed on the inside furnace tubes. Coke has several industrial uses, including, but not limited to, making electrodes for aluminum manufacturing, fuel, and steel manufacture.

"Coking" refers to a process of forming coke from a carbon-containing combustible starting material. For example, a starting material can be heated from about 100° C. to about 450° C., wherein lower molecular weight chemicals are distilled off and coke is left behind. Coking can be used to improve hydrocarbon liquids for further upgrading by catalytic processing because many chemicals that poison catalysts have been removed. Removal of heteroatoms from the starting material is counterbalanced by increased hydrogen content in the supernatant, because most polynuclear aromatic building blocks in the petroleum contain heteroatoms that reactively separate into the coke.

"Gasification" refers to conversion of a hydrocarbon fuel, such as coal, petroleum, biofuel, biomass, or coke derived from a variety of sources, into carbon monoxide (CO) and hydrogen ($H_2$) by reacting the fuel at elevated temperature (>700° C.) with oxygen and/or steam and producing syngas. Gasification can use materials that are not otherwise useful fuels, such as biomass or organic waste. In addition, high-temperature combustion refines out corrosive ash element, such as chlorine and potassium, producing clean gas from otherwise problematic fuels.

"Steam methane reforming", "steam reforming" or "SMR" refers to a common and relatively inexpensive gasification process for producing bulk hydrogen. At temperatures of 700-1100° C. in the presence of a metal-based catalyst (e.g., nickel), steam endothermically reacts with methane to yield carbon monoxide and hydrogen (Equation 1):

$$CH_4 + H_2O \leftrightharpoons CO + 3H_2 \quad \text{(Equation 1)}$$

Additional hydrogen can be recovered by a lower-temperature, exothermic reaction with the carbon monoxide produced (Equation 2):

$$CO(g) + H_2O(g) \leftrightharpoons CO_2(g) + H_2(g) \quad \text{(Equation 2)}$$

This reversible, gas-phase reaction, known as the water gas shift (WGS), can quickly equilibrate at gasifer temperatures, balancing the concentrations of CO, $H_2O$, $CO_2$ and $H_2$.

The gasification catalyst can comprise, for example, nickel, palladium, platinum, iron, cobalt, manganese, tungsten, molybdenum, tantalum, alkali earth metals, alkali earth metal oxides, sand, dolomite, and mixtures thereof. Alkali earth metals consist of beryllium, magnesium, calcium, strontium, barium, and radium. Examples of alkali earth metal oxides include, but are not limited to beryllia (beryllium oxide, BeO), magnesia (magnesium oxide, MgO), lime (calcium oxide, CaO), strontia (strontium oxide, SrO), and baryta (barium oxide, BaO).

Small particle size with high surface area is preferred for catalysts. The bulk density ranges from 0.5 to 1.2 g/mL, preferably between 0.5 to 0.9 g/mL, and having a particle size distribution ranging from 10 to 150 μm, preferably between 50 to 100 μm. The first temperature can be from 50° C. to 650° C., preferably between 70° C. to 400° C., and most preferably between 80° C. to 300° C. The first period of time can be from less than 60 seconds to 2 hours, preferably between 60 seconds to 1 hour, most preferably between 1 and 10 minutes.

A "gasifier" is a device in which a hydrocarbon fuel undergoes pyrolysis, combustion and, ultimately, gasification.

Pyrolysis occurs when a carbon-containing material, such as a hydrocarbon fuel, is heated. Volatiles are released and char is produced, resulting in for example a 70% weight loss. The structure and composition of the char varies depending on the property of the fuel. Combustion occurs as the volatile products and some of the char reacts with oxygen to form $CO_2$ and CO, providing heat for the subsequent gasification. Types of gasifiers include, for example, counter-current fixed bed; co-current fixed bed, fluidized bed, and entrained flow gasifiers.

The counter-current fixed bed ("up draft") gasifier comprises a fixed bed of hydrocarbon fuel through which steam, oxygen and/or air flow in counter-current configuration. Ash is removed dry or as a slag. Because this gasifier uses a fixed bed of fuel, the fuel must have a high mechanical strength and is ideally non-caking so that the bed can be permeable. Thermal efficiency is high because gas exit temperatures are relatively low, but tar and methane production is significant at typical operation temperatures, so product gas must be extensively cleaned before use.

The co-current fixed bed ("down draft") gasifier is similar to the counter-current type, but the steam, oxygen and/or air flow in co-current configuration with the fuel downwards. Heat is added to the upper part of the bed, either by combusting small amounts of the fuel or from external heat sources. Since tar must pass through a hot bed of char in this configuration, tar levels are much lower than the counter-current type.

In the fluidized bed reactor, the fuel is fluidized in oxygen, steam and/or air. The ash is removed dry or as heavy precipitants. The temperatures are relatively low in dry ash gasifiers, so the fuel must be highly reactive. The agglomerating gasifiers have slightly higher temperatures, and are suitable for higher rank coals. Fuel throughput is higher than for the fixed bed, but not as high as for the entrained flow gasifier. Fluidized bed gasifiers are most useful for fuels, such as biofuels, that form ash that is highly corrosive to the walls of slagging gasifiers.

In the entrained flow gasifier, a dry pulverized solid, an atomized liquid fuel or fuel slurry is gasified with oxygen or, less frequently, air in a co-current flow. Gasification occurs in a dense cloud of very fine particles at high temperature and pressure. The high temperature and pressure allows higher throughput and produces less tar and methane than other gasifiers, but the oxygen requirement is higher. Entrained flow gasifiers remove most ash as a slag as the operating temperature is well above the ash fusion temperature. Some fuels, in particular certain types of biomasses, can form slag that is corrosive for protective ceramic inner walls.

The second temperature can be 400° C.-1000° C. The second period time can depend on the temperature used: the lower the temperature, the longer the time required. For example, low temperatures require between 10 minutes to more than 2 hours while high temperatures require contact times of less than 10 minutes. The pressure can be above ambient pressure, for example between 14 psi and 300 psi (about 100 kPa to 2 MPa).

"Synthesis gas" or "syngas" refers to a gas consisting essentially of $H_2$ and CO, which can be produced from a hydrocarbon fuel, such as a biomass fuel. Syngas derived from a biomass can be referred to as "biosyngas". Hydrogen can be recovered from syngas. Syngas can also be catalytically converted to methanol, run through a biological reactor to produce ethanol, or be converted using a Fischer-Tropsch catalyst into a liquid stream with properties similar to diesel fuel, called Fischer-Tropsch diesel. These processes, however, can be expensive, and can generate fuels that are not easily assimilated in current transportation technology. Nonetheless, using syngas is potentially more efficient than direct combustion of the original fuel, because it can be combusted at higher temperatures or in fuel cells, so that the thermodynamic upper limit to the efficiency defined by Carrot's rule is higher or not applicable.

"Thermogravimetric analysis" or "TGA" refers to a method for determining changes in sample weight as a function of temperature. The analysis relies on highly precise measurements of weight, temperature and temperature change. A derivative weight loss curve can tell the point at which weight loss is most apparent. Interpretation can be limited without further modification and deconvolution of overlapping peaks. TGA can be used in tandem with mass spectrometry (MS) to determine off-gas composition.

The present invention is exemplified with respect to gasification of a biomass feedstock. However, this feedstock is exemplary only, and the invention can be broadly applied to any hydrocarbon fuel, including fossil fuels such as crude oil and coal. The following examples are intended to be illustrative only, and not unduly limit the scope of the appended claims.

EXAMPLE 1

Soaking and Coking of Pyrolysis Oil

A neat pyrolysis oil was soaked onto various supports including silica and nickel supported on silica. Using incipient wetness, the ratio of pyrolysis oil/support reached 3:1. The soaked material was placed in a flask and heated to temperatures up to 500° C. in an inert atmosphere.

Water vapor was condensed downstream. Remaining off-gases were analyzed by online mass spectrometry (MS). Additionally, fresh and resulting coked support was analyzed using thermogravimetric analysis mass spectroscopy (TGA-MS). Used, neat pyrolysis oil coked completely between 320° C. and 350° C., where complete coking was defined as the point when no $CO_2$ evolution could be monitored. The nickel-containing catalyst lowered coking temperatures by 50° C.-100° C. Furthermore, off-gas composition changed significantly when using the nickel-based catalyst: more light carbon-containing gases (e.g., methane, ethane) were observed compared to use of unmodified silica. Therefore, the soak and coke method was more efficient and produced a better product.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The following references are incorporated by reference in their entirety:
CN1435369.
CN1214972.
US2008244976.
US2007100003.

What is claimed is:

1. A method for producing hydrogen gas, comprising:
   a. sorbing a liquid hydrocarbon fuel to a gasification catalyst to form a sorbed hydrocarbon fuel;
   b. heating said sorbed hydrocarbon fuel to a first temperature from about 80° C.-300° C. for a first period of time sufficient to form coke; and
   c. gasifying said coke at a second temperature at a pressure for a second period of time in the presence of water and/or oxygen, so as to produce a gaseous mixture comprising hydrogen gas and carbon monoxide, and to regenerate said catalyst,
   wherein said liquid hydrocarbon fuel is a liquid biomass or a liquefied biomass.

2. The method of claim 1, wherein said liquid hydrocarbon fuel is a pyrolysis oil.

3. The method of claim 1, wherein said gasification catalyst comprises one or more selected from the group consisting of nickel, palladium, platinum, iron, cobalt, manganese, tungsten, molybdenum, tantalum, alkali earth metals, and oxides thereof, dolomite, sand, and mixtures thereof.

4. The method of claim 1, wherein said gasification catalyst has a particle size distribution of 10 μm to 150 μm.

5. The method of claim 4, wherein said particle size distribution is 50 μm to 100 μm.

6. The method of claim 1, wherein said first period of time is 1 second to 2 hours.

7. The method of claim 6, wherein the first period of time is 1-60 minutes.

8. The method of claim 7, wherein the first period of time is 1-10 minutes.

9. The method of claim 1, wherein said second temperature is from 400° C. to 1000° C.

10. The method of claim 1, further comprising:
    a. subjecting said gaseous mixture to a water-gas shift, as to produce additional hydrogen gas; and
    b. isolating said hydrogen gas and said additional hydrogen gas from said gaseous mixture.

11. A method for producing hydrogen gas, comprising:
    a. sorbing a liquid or liquefied biomass to a gasification catalyst to form a sorbed biomass, wherein said gasification catalyst comprises one or more selected from the group consisting of nickel, palladium, platinum, iron, cobalt, manganese, tungsten, molybdenum, tantalum, alkali earth metals, and oxides thereof, dolomite, sand, and mixtures thereof;
    b. heating said sorbed biomass to a first temperature of from about 80° C.-300° C. for a first period of time of 1 second to 2 hours to produce coke; and
    c. gasifying said coke at a second temperature 400° C.-1000° C. in the presence of steam and/or oxygen and said catalyst sufficient, so as to produce a gaseous mixture comprising hydrogen gas and carbon monoxide, and to regenerate said catalyst.

12. The method of claim 11, wherein said liquid biomass is a pyrolysis oil.

13. The method of claim 11, wherein said gasification catalyst has a particle size distribution of 50 to 100 μm.

14. The method of claim 11, wherein said first period of time is 1-10 minutes.

15. The method of claim 11, further comprising:
    a. subjecting said gaseous mixture to a water-gas shift, as to produce additional hydrogen gas; and
    b. isolating said hydrogen gas and said additional hydrogen gas from said gaseous mixture.

16. The method of claim 15, wherein said method is carbon neutral.

* * * * *